Patented Mar. 26, 1940

2,194,629

UNITED STATES PATENT OFFICE 2,194,629

PRODUCTION OF LIGHT-RESISTANT COMPOSITIONS

Earl H. Addison, Chicago, Ill., assignor to The Sherwin-Williams Company, Cleveland, Ohio, a corporation of Ohio No Drawing. Application February 2, 1939, Serial No. 254,163

5 Claims. (Cl. 88—115)

The present invention relates to improvements in organic paints, varnishes, enamels, lacquers, plastics, film material, and like compositions which are injured by sunlight or ultraviolet light.

It is well known that many organic substances of the character referred to are not as stable when exposed to direct sunlight, as otherwise, and it is recognized that the ultraviolet fraction of the light is largely responsible for the injury. The presence of pigments in these compositions frequently exerts a protective influence, but pigment particles may act in part as reflectors of ultraviolet light, rather than as absorbers.

It is the object of the present invention to add to such organic compositions a chemically inert finely divided solid, which is absorbent of ultraviolet light and which has little or no effect on color, and which may have little or no effect upon transparency, whether or not there is a pigment content.

The present invention is based upon the discoveries that silicates of lead have high absorptivity of ultraviolet light and a transparency to visible light, and that they may be incorporated into compositions with or without pigment, and give little or no color change, or indication of their presence. It has been found that such an agent transmits visible light so as not to affect the natural color to the eye, and absorbs the ultraviolet light to prevent it passing deeply into the composition. Another important feature of the invention is the permissible variation of the ratio of the lead oxide, the silicon dioxide, and the water contents of the agent. It is well known that a transparent particle within a transparent matrix is visible therein when the refractive indices are different, and invisible when the refractive indices are the same. By varying the composition of the lead silicate a wide range of refractive indices thereof may be obtained. Thus, lead silicate may be made of a specified refractive index corresponding to the refractive index of the matrix to receive it. Exact duplication of indices is not requisite, as will readily be appreciated by those skilled in the art. It is to be appreciated that the closer the correspondence is, the greater will be the proportion of the lead silicate which may be added, without it becoming noticeable.

The use of a solid insoluble agent for the purpose described is particularly advantageous because it may be easily incorporated like a pigment, and where a pigment is also used, the two may be incorporated together. In fact the two may be integrally associated by process of manufacture, as described in the copending application of Livingston, Serial No. 196,367, filed March 17, 1938. The material is inorganic and highly insoluble in water and solvents. No solvents are required for it. Therefore, there is no new solvent problem for any composition which is to form the matrix. Where the lead silicate is dispersed in a solution which requires evaporation to deposit the matrix, it may give the solution a gray or other color difference and be highly visible therein, and yet as the solvent is lost the grayness or color difference will disappear. This is because the preferred lead silicate is chosen to have a refractive index close to that of the ultimately deposited film, which index may readily be vastly different from that of the solution of the matrix in the volatile solvent.

Processes for the manufacture of lead silicate are well known, and are not to be considered as the invention being claimed. However, the methods require some discussion in order to permit perfect understanding of the present invention.

Lead silicates may be prepared by interaction of a soluble lead salt and a soluble silicate, such as those of the alkali metals, perferably sodium. It is well known that sodium silicate exists in many forms with a high and a low ratio of silicon dioxide to sodium oxide. Where a high index of refraction in lead silicate is desired, it must have a high lead content, and a low silica content. Hence a sodium silicate low in silica is employed for the reaction. Also, it is well known that precipitated metal silicates may carry a high content of water-of-hydration, and that this is lost gradually with increasing severity of heat in drying or calcining, and is all lost on fusing. Changes in the water-of-hydration also affect the refractive index. Thus heating a precipitated lead silicate may be practiced to alter the index of refraction, where the ratio of lead oxide to silicon dioxide remains fixed.

Lead silicates are all substantially transparent, and have no color or pigment value in the sense that pigments have such value. However, they have other valuable properties of pigments. They may be flushed from a water vehicle into an oil or other vehicle which is immiscible with water. They are easily filtered, washed, dried and ground. They are easily milled into the compositions into which pigments may be milled, or otherwise dispersed. They give stable dispersions showing little tendency to settle.

By reason of these similarities to pigments many variations in processing are permissible.

The lead silicate may be precipitated in the presence of pigments, so as to coat the pigment particles. Pigments and the lead silicate may be coprecipitated. For example, a soluble lead salt, as lead nitrate, may be reacted with a solution containing sodium chromate and sodium silicate.

Example 1

600 grams of lead nitrate—$Pb(NO_3)_2$—are dissolved in 1500 grams of water with 3 cc. of concentrated nitric acid to prevent hydrolysis. 348 grams of hydrated sodium meta-silicate —$Na_2SiO_3.5H_2O$—are dissolved in 100 grams of water. The clear solutions are reacted, by adding the lead nitrate solution to 3000 grams of boiling water, and slowly adding thereto the silicate solution, with stirring, over a period of 15 minutes. The precipitate is filtered and washed with water 3 or 4 times, then dried in an oven at a moderate heat.

Example 2

In Example 1 change the sodium silicate to 417 grams of $Na_2Si_2O_5.4H_2O$ and a lead silicate of lower index of refraction is obtained.

Example 3

A dried lead silicate is dispersed by grinding in a pebble mill for 24 hours into a mass as follows:

| | Parts by weight |
|---|---|
| Lead silicate | 165 |
| Lacquer thinner (toluene, 60%; butyl acetate 30%; butyl alcohol 10%) | 643 |
| Dibutyl phthalate | 75 |
| Damar resin (dewaxed) | 117 |

This results in a paste suitable for addition to nitrocellulose lacquers, the index of refractions being suitably considered as described.

Example 4

1068 grams of the water-wet precipitate of Examples 1 and 2, having 77.8% water and 22.2% lead silicate (determined by ashing) is mixed with 178 grams of blown castor oil, and the water broken out by stirring and heating in a vacuum. Toluene is added to facilitate the process. The completed composition is:

| | Per cent |
|---|---|
| Lead silicate | 36 |
| Blown castor oil | 27 |
| Toluene | 37 |

The above is mixed with commercial 30% alcohol-wet ½-second-viscosity nitrocellulose in the proportion of 528 parts of paste to 550 parts of nitrocellulose, and milled to a composition:

| | Per cent |
|---|---|
| Lead silicate | 15.2 |
| Blown castor oil | 11.4 |
| Nitrocellulose | 30.0 |
| Volatile solvents | 43.4 |

This composition is dissolved in about an equal quantity of lacquer solvent giving a paste which may be used in a clear lacquer in quantity to give 6% lead silicate in the non-volatile content. Such a lacquer exposed to outside conditions and sunlight in comparison with a like one lacking the lead silicate, shows greatly reduced darkening, and failure by checking is noticeably retarded. The two compared lacquers applied on metal were initially indistinguishable, because the lead silicate used was very close in its index of refraction to the non-volatile portion of the lacquer.

When pigments are present in such comparative lacquers, the lead silicate gives lengthened life, reduced chalking, reduced bronzing, and improved color retention. I have used up to 8% of lead silicate in the non-volatile content, but above that, great care must be exercised in matching the indices of refraction. At below 2% the effects are not very noticeable.

The same type of benefits are secured in other compositions. Pigment breakdowns are also minimized. There is retarding of both bronzing and darkening of Prussian blues and organic maroons, of chalking and darkening of cadmium reds, of chalking of titanium dioxide whites, and in general of discoloration and film failure of organic colors.

The lead silicate may be employed in cellulose ether and ester compositions with and without their modifiers, such as resins and plasticizers. The poorer the durability of a vehicle, the greater is the apparent benefit of lead silicate therein. Thus, the less expensive compositions may be raised in quality toward the more costly compositions.

Synthetic vehicles based on synthetic resins, and varnishes, enamels, and paints based on combinations of drying oils and synthetic or natural resins, are also benefited by lead silicate inclusion.

The invention is not limited to fields mentioned specifically above. Lead silicate may be present in Cellophane and other sheeting and films, to protect not only the film, but also things screened from ultra violet light by the film. Rayon and other synthetic fibers may incorporate it, especially for light-fastness to dyes therein. Inks may include it for light fastness. Rubber, rubber derivatives and plastics having it, are protected from breakdown by ultra violet light, and are preserved in color value. Photographic film may be rendered more opaque to ultra violet light than normally, for special effects in using such film. Where pigments are employed the lead silicate may be precipitated in the presence of suspended pigment particles to provide a coating thereon, protecting the pigment particle itself from ultra violet light. The lead silicate may be more intimately associated with the pigment in the manner described in the said Livingston application.

The term "lead silicate" in the claims comprehends the hydrated and anhydrous forms.

All of these and other uses are contemplated as falling within the invention as expressed in the appended claims.

I claim:

1. An organic composition comprising a matrix of an organic base material subject to injury by incident ultra violet light, and finely divided particles of lead silicate distributed throughout the matrix in quantity of at least 2% of the base material, as an absorbent of ultra violet light, said matrix being transparent and of substantially the same index of refraction as the lead silicate whereby the latter is relatively invisible to the eye in said matrix.

2. An organic composition comprising a matrix of an organic base material subject to injury by incident ultra violet light, a pigment in said matrix, and finely divided particles of lead silicate distributed throughout the matrix in quantity of at least 2% of the base material, as an absorbent of ultra violet light, said matrix being transparent and of substantially the same index of refraction as the lead silicate whereby the latter is relatively invisible to the eye in said matrix.

3. A coating composition adapted to be dried to a transparent film, comprising a film-forming matrix of organic material subject to injury by ultra violet light and upwardly of 2% dispersed lead silicate having an index of refraction close to that of the film formable from said matrix.

4. A coating composition to be applied to form a transparent film and adapted to provide protection from ultra violet light, comprising a film-forming matrix and upwardly of 2% dispersed lead silicate having a refractive index close to that of the film formable from said matrix.

5. A transparent film comprising a transparent organic matrix and upwardly of 2% of lead silicate dispersed therein, whereby the film is absorptive of ultra violet light, said matrix and said lead silicate having substantially the same indices of refraction whereby the film is transparent.

EARL H. ADDISON.